Oct. 4, 1932.  F. H. BEAMER  1,881,308
RESILIENT CENTERING DEVICE
Filed Sept. 5, 1931  3 Sheets-Sheet 1

Frank H. Beamer, Inventor.
By Emil Kenkart
Attorney.

Witness:
J. J. Oberst,

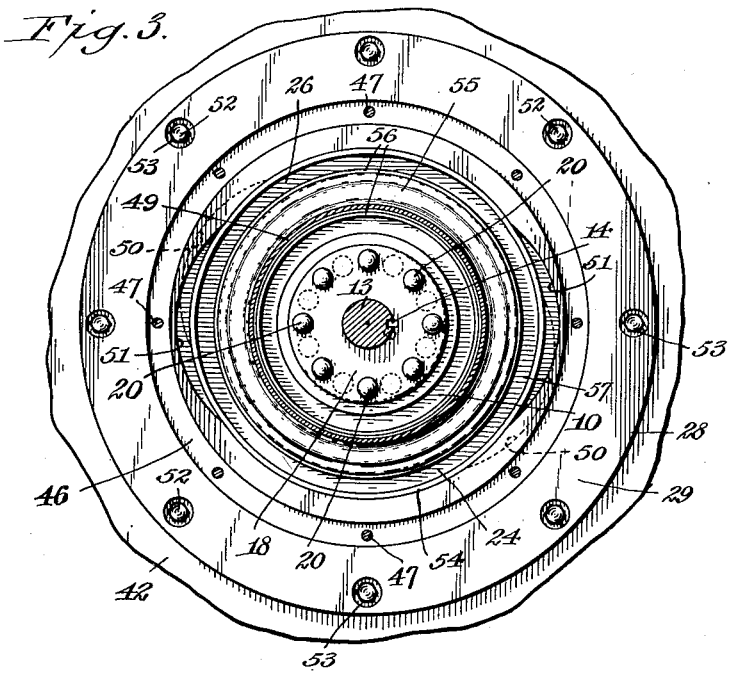
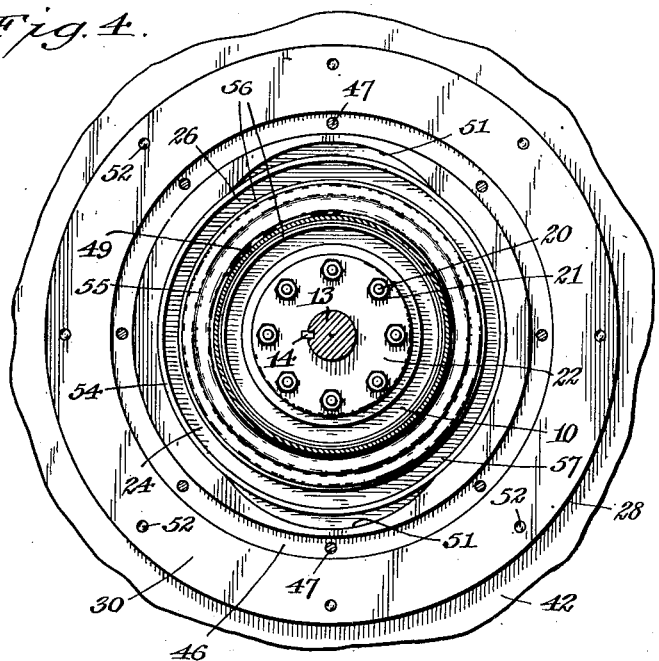

Oct. 4, 1932.  F. H. BEAMER  1,881,308
RESILIENT CENTERING DEVICE
Filed Sept. 5, 1931  3 Sheets-Sheet 3

Patented Oct. 4, 1932

1,881,308

UNITED STATES PATENT OFFICE

FRANK H. BEAMER, OF BUFFALO, NEW YORK

RESILIENT CENTERING DEVICE

Application filed September 5, 1931. Serial No. 561,403.

My invention relates to improvements in a resilient centering device capable of use for many purposes, but particularly designed as a resilient centering device or hub structure for vehicle wheels, pulleys, cable sheaves, railway car wheels, and rotatable elements of various kinds, and as bearings for centering shafts, and for line shafting.

One of the objects of my invention is the provision of a resilient centering device having the qualities of maintaining parts coaxial relatively, yet permit relative movement of said parts radially and rotatively.

A further object of my invention is the provision of a resilient device capable of use as a resilient support whereby one object or part may be maintained in a predetermined position with respect to another, yet yield under strains or jars, and wherein provision is made to recover itself under normal conditions so that the objects or parts will be maintained in their predetermined relative positions.

A still further object is to provide new and novel means for yieldingly centering one object or part with respect to another and allow both straight lined and rotative movement relatively of said objects or parts; also to provide means to limit the relative rotative movement and gradually increase the resistance thereto until a definite stop in the movement is provided.

With the above and other objects in view to appear hereinafter, my invention consists in the novel features of construction and in the arrangement and combination of parts to be hereinafter described and more particularly pointed out in the subjoined claims.

In the drawings I have illustrated the invention in the form of a resilient hub for vehicle wheels and pulleys, and from the description to follow it will be apparent that the invention will function equally well for other purposes.

In the drawings:

Fig. 3 is a section on a reduced scale taken on line 3—3, Fig. 2.

Fig. 4 is a section on a reduced scale taken on line 4—4, Fig. 2, looking in the direction of the arrow crossing said line.

Figure 1:
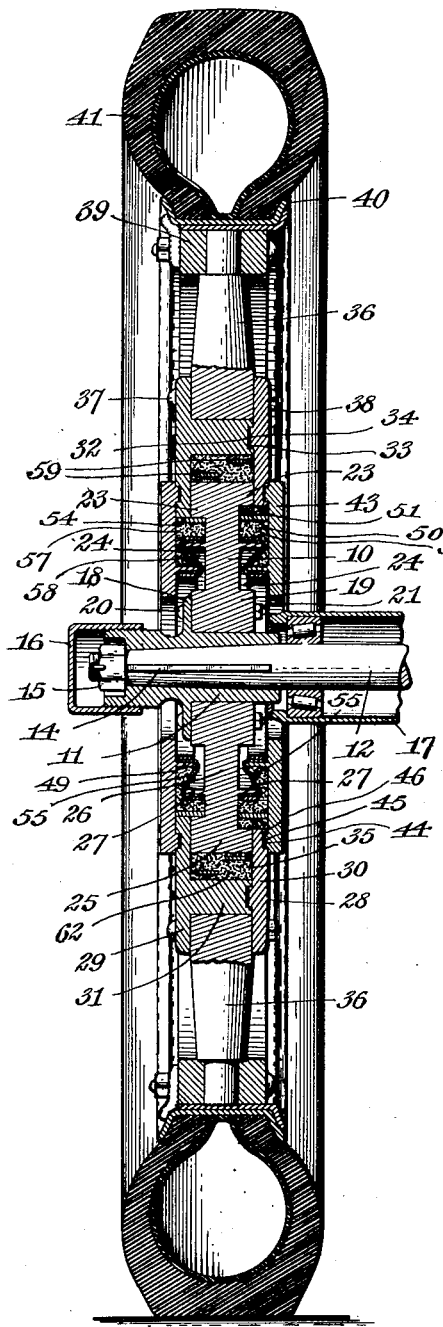
Fig. 1 is a diametral section through a vehicle wheel having my invention applied thereto.
Figure 2:
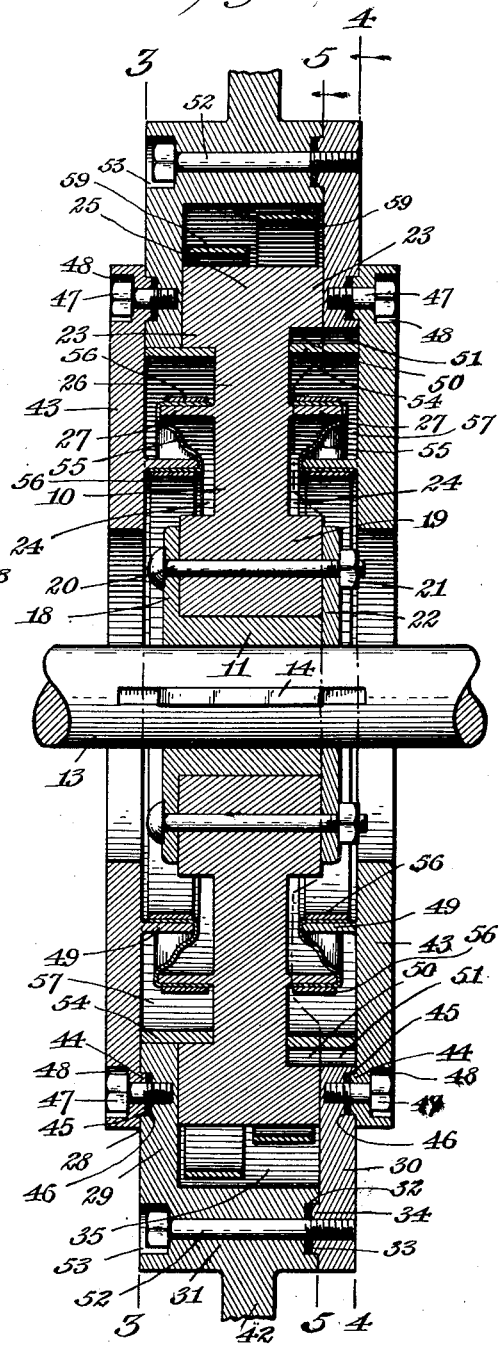
Fig. 2 is an enlarged diametral section through the hub structure or resilient centering portion of a pulley, sheave, or other rotating object secured to a shaft.
Figure 5:
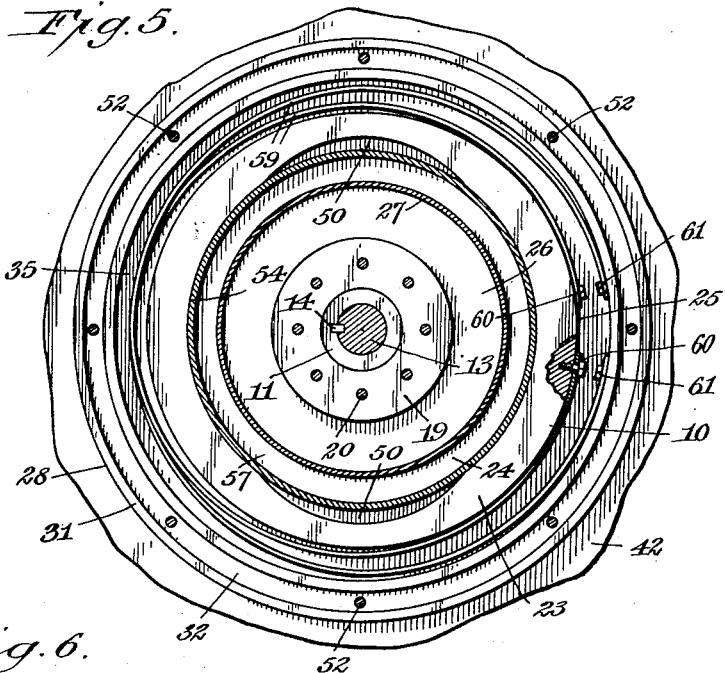
Fig. 5 is a section on a reduced scale taken on line 5—5, Fig. 2, looking in the direction of the arrow crossing said line.
Figure 6:
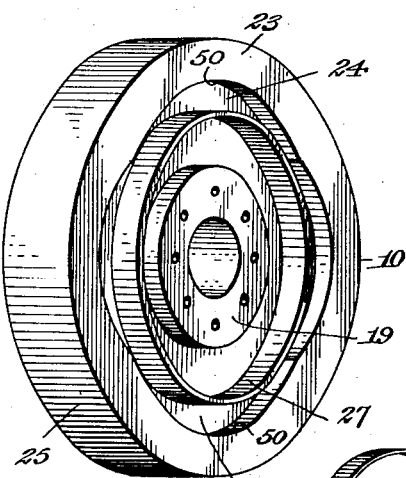
Fig. 6 is a detached perspective view of the inner main member of the device.
Figure 7:
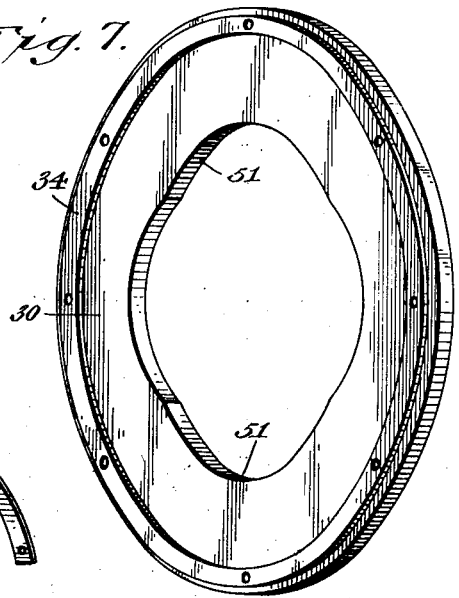
Fig. 7 is a detached perspective view of one of the circular side plates forming part of the outer main member or housing of the device.
Figure 8:
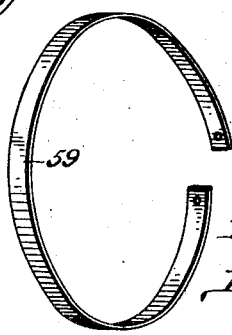
Fig. 8 is a detached perspective view of one of the equalizing or governing spring bands.

Reference being had to the drawings, 10 designates what I term a weight carrier or shock diffuser in the form of a center member or hub plate provided with an axial opening into which a bushing 11 is fitted; the bushing in Fig. 1 being an axle bushing, while that shown in Fig. 2 is a shaft bushing. The bushing is secured to an axle 12 in Fig. 1, and to a shaft 13 in Fig. 2. A key 14 fitted into the axle or shaft enters the bushing and compels the latter to rotate with the axle or shaft, as the case may be.

When applying my invention to a vehicle wheel in the manner shown in Fig. 1, the bushing 11 serves as part of the hub of the wheel, and it has the tapered end of the axle 12 passed therethrough; a nut 15 being applied to the end of the axle in the usual manner, and a hub cap 16 to the end of the bushing. This bushing may extend through the hub plate or center member 10 and enter the axle housing or sleeve 17.

In the application of my invention shown in Fig. 1, the bushing 11 is provided with an outstanding flange 18, which bears against the outer side of the hub 19 of said hub plate or center member 10, securing bolts 20 being passed through said outstanding flange and through said hub 19, and to the inner projecting ends of these bolts, nuts 21 are applied, said nuts bearing against the inner side of the hub of said hub plate or center member.

In the construction shown in Fig. 2, the bushing is also provided with the outstanding flange 18, and it has its inner end terminating flush with the inner face of the hub 19 on the hub plate or center member. A circular plate 22 bears against the inner side of said hub 19 and against the inner end face of the bushing. In this construction the bolts 20 are passed through the outstanding flange 18 of the bushing and the hub 19 of the hub plate or center member, also through the circular plate 22, and have the nuts 21 applied thereto and bearing against the inner face of said circular plate.

The hub plate or center member, referred to under the broader term of weight carrier or shock diffuser, is of circular formation and has marginal flanges 23 at opposite sides, thus forming annular grooves or depressions 24 on opposite sides of the hub plate or center member between said flanges and the opposite end portions of the hub 19. This hub plate or center member therefore comprises the hub 19, a rim 25 including the marginal flanges 23, and a web 26 connecting said hub and rim. Projecting from the opposite sides of said web in spaced relation to the rim and the hub, are annular flanges 27 of a depth somewhat greater than the depth of the annular grooves or depressions 24.

Surrounding the outer portion of said hub plate or center member 10 is an annular housing 28, preferably a spring housing, which may be constructed in various ways. In the construction shown in Fig. 1 this housing comprises two annular plates or rings 29, 30, from the inner side of one of which an annular flange 31 extends, the free end of which bears against the opposite annular plate or ring 30 and in the end face of said flange, an annular groove 32 is formed in which a packing ring 33 is placed.

The ring or plate 30 has on its inner face an annular rib 34 which is entered in the groove 32 in said flange and compresses the packing ring 33 therein. Flange 31 surrounds the hub plate or center member 10 and is spaced from the peripheral face of the latter by an annular chamber 35.

Between the marginal portions of the annular plates or rings 29 and 30, spokes 36 of the wheel are inserted; said spokes bearing with their inner ends against said annular flange 31. Bolts 37 are passed through the marginal portions of said annular plates or rings and through said spokes, nuts 38 being applied to said bolts to securely fasten the spokes between said plates or rings, and to compress the packing ring 33 within its groove; thus rendering the joint water-tight between the free end of said annnular flange and the annular plate or ring 30. The outer ends of the spokes are secured in the felloe 39 of the wheel, to which a tire rim 40 is secured in any approved manner. A pneumatic or other rubber tire 41 is secured in said tire rim. Any form of rim and tire other than that shown may, of course, be used, as this forms no portion of my invention. The annular flange 31 is of a width slightly greater than that of the rim 25 of the hub plate or center member 10 so that the annular plates or rings 29 and 30 may ride in contact with the end faces or edges of said rim.

The construction of the housing shown in Fig. 2 is similar to that shown in Fig. 1, with the exception that the outer edges of the annular plates or rings 29 and 30 are flush with the outer peripheral face of the annular flange 31, and that the web of a wheel, pulley, sheave, or the like extends outwardly from said annular flange; it being an integral part of the flange 31 and annular plate or ring 29, and designated by the numeral 42.

Applied to the outer faces of the annular plates or rings 29 and 30 are retainer rings or annuli 43. The outer marginal portions of these overlap the inner marginal portion of the annular plates or rings 29 and 30 and have on their inner sides of their overlapping portions, annular ribs 44 which bear against packing rings 45 entered in annular grooves 46 in the overlapped inner marginal portions of the annular rings or plates 29 and 30. Bolts 47 are passed through the overlapping marginal portions of the retainer rings or annuli, through the packing rings 45 and enter the annular plates or rings 29 and 30; the heads of said bolts being entered in sockets 48 formed in the retainer rings or annuli so as to avoid all projecting parts.

Extending from the inner faces of these retainer rings or annuli are annular flanges 49 which are arranged to enter the annular grooves or depressions 24 in the hub plate or center member 10 between the annular flanges 27 and the hub 19 of said hub plate or center member.

The inner peripheral faces of the flanges 23 on the hub plate or center member are provided at diametrically opposite points with concaved dips or depressions 50, the dips or depressions at one side of this hub plate or center member being at right angles to those at the other side thereof and normally the inner edges of the annular plates or rings 29 and 30 are flush with the inner peripheral faces of said flanges 23, the inner edge of each annular plate or ring being provided at diametrically opposite points with concaved dips or depressions 51, the dips or depressions in the flange and annular plate or ring at each side of the device being in registration and disposed in a plane at right angles to those at opposite side of the device.

It may here be stated that the annular plates or rings 29 and 30 are held in spaced relation by the flange 31 projecting from one of said plates and by means of screw bolts 52 passed through the circular plate or ring 29 and the flange thereof and threaded into the circular plate or ring 30, said bolts passing through the packing 33 and the rib 34 of the circular plate 30 and having their heads entered in sockets 53 formed in plate 29 so that there are no projecting parts. When these bolts are tightened the gasket 33 is compressed within its groove by the rib 34 and the joint between the edge of flange 31 and circular plate or ring 30 rendered water-tight. The several members of the device are normally co-axial and are so maintained by springs 54 bearing against the inner edges of the annular plates or rings and the inner peripheral faces of the annular flanges on the hub plate or center member between the arcuate dips or depressions therein. Said springs are preferably endless and of a diameter slightly larger than the diameter of the openings in said annular plates or rings and the outer diameter of the annular grooves or depressions 24 in the hub plate or center member 10. Consequently, when the springs are positioned within the device, it will be found that they extend slightly into the arcuate dips or depressions 50 and 51 and therefore offer resistance to relative rotary motion of the hub plate and the annular housing 28 with its retainer rings 43.

Extending from the annular flanges 27 on the web 26 and the annular flanges 49 on the retainer rings are flexible strips 55, the outer marginal portions of which overlie the outer surfaces of the annular flanges 27 while the inner marginal portions overlie the inner surfaces of the annular flanges 49, and these marginal portions are clamped against said flanges by annular retainer springs 56.

The rim 25 of the hub plate or center member 10, the annular plates or rings 29 and 30, the retainer rings or annuli 43, the annular flanges 27 and 49, and the flexible strips 55 constitute the walls of a spring chamber 57 formed at each side of the device, which include the outer regions of the annular grooves or depressions 24, and in these spring chambers the retainer springs 54 are located. In these spring chambers I preferably insert a semi-fluid lubricant shown for example in Fig. 1 and designated by the numeral 58. Pressure is applied to this lubricant at different regions in the circumference of the spring chamber 57, by reason of relative movement of the hub plate or center member and the parts at opposite sides thereof and surrounding it; the lubricant becoming displaced from one region, by reason of such region becoming radially reduced in size under action of the device, and finding its way to other regions of said spring chamber, due to the fact that such other regions become radially enlarged. The lubricant is, therefore, constantly under action and assurance is given that the springs 54 will be lubricated at all points. Moreover, by reason of the sliding fit between the hub plate or center member and the annular plates or rings 29 and 30, the lubricant may work outwardly between these parts and enter the annular chamber 35.

The springs 54 within the spring chamber 57 also tend to keep the hub plate or center member and parts to which it is applied centrally disposed within the housing surrounding the same and having parts at opposite sides thereof.

The annular chamber 35 between the hub plate or center member 10 and the annular flange 31 of the housing is, in some instances, used as an annular spring chamber. When so used, opposite straining devices are arranged therein in the form of convolute springs 59 disposed in opposite directions; one end of each of said springs being secured to the outer peripheral face of the hub plate or center member 10, as at 60, and the other end thereof to the inner peripheral face of the flanges 31 of the housing, as at 61. These springs are reversed in directions so that one tends to draw the housing rotatively in one direction and the other rotatively in the other direction, thus providing a yielding connection between the center member and the housing to limit rotative movement relatively between these parts. One spring, therefore, acts contrary to the other so that upon starting rotation of the axle or shaft, as the case may be, in a forward direction, one of these springs will be pulled upon while the other is idly yielding under pushing action, and these springs come into action in a reverse direction upon rotating the axle or shaft in the opposite direction. This is a highly desirable feature of my invention; yet for certain uses these equalizing or governing springs, as they may be termed, may be dispensed with. They, however, are found to be highly desirable when embodied in the construction of traction wheels, particularly automobile wheels, since they eliminate all jars on the body of the automobile when starting or reversing the same. For example, with the weight of the automobile supported by the traction wheels; the road surface on which the wheels rest offers considerable resistance against the rotative starting movement of the wheels. Consequently, when the driving axle of the automobile is rotated in a forward direction, one of the equalizing springs will be pulled upon, with the result that the inner end thereof attached to the hub plate or center member will be moved toward and possibly beyond the other end thereof, resulting in the spring closing upon the peripheral surface of said hub plate or center member. The other spring will idly yield under pushing action and tend to open or expand against the inner peripheral surface of the flange 31 of the housing. When reversing the driving axle, these springs operate in the same manner, with the exception that the spring, which closes upon the hub plate or center member when moving forward, opens or expands against the inner peripheral face of the flange 31 of the housing, and the spring which expands when starting the axle in a forward direction will close upon the peripheral surface of the hub plate or center member 10. Such action takes place until the resistance of the wheel against the road surface has been overcome, after which the traction wheel is gradually brought into action. Both springs then return to normal positions and act under like strains to prevent relative rotative movement of the hub plate or center member and the parts surrounding and lying against the sides of the same.

The hub plate or center member may have its center varied in construction, so long as it has an axial opening, with or without hubs, and provides sufficient bearing for an axle or shaft, to which it is to be secured. It may also have a marginal flange at one side only, but this flange co-acting with a spring, such as 54, would not be as effective as providing the center or hub member with two marginal flanges on opposite sides thereof for co-action with two separate springs.

It will be apparent from the foregoing, that the arcuate dips or depressions 50 and 51 in the marginal flanges of the hub plate or center member and in the inner edges of the circular plates or rings 29 and 30, respectively, may vary in depth; but on a centering device approximately eight to twelve inches in diameter, a dip or depression of one quarter of an inch at its greatest depth will be found quite sufficient. These dips or depressions may be said to be arranged in pairs at each side of the web on the hub plate or center member.

In accordance with my invention, the so flanged hub plate or center member is arranged for movement within a housing provided with sides having comparatively large axial openings, said sides being hereinbefore more particularly referred to as circular plates or rings; and between these sides or side members a peripheral wall, described as being in the form of an annular flange, such as 31, projecting inwardly from one of the annular plates or rings, is arranged. This peripheral wall may be otherwise formed, so long as it properly spaces the side members of the housing from each other and provides between them a properly-sized space for sliding movement with respect to the marginal portion of the hub plate or center member. Said side members are spaced a few thousandths of an inch farther apart than the transverse dimension of the marginal portion of the hub plate or center member so that the latter may have free sliding movement within the housing, under which term I include rotative and oscillatory movement.

The equalizing or governing springs 59 constitute a governing device, and in addition to the advantages set forth, they also regulate or determine the range of rotary movement of the weight carrier or diffuser within the housing, and it is to be noted that the spring forced under pushing movement has a tendency to cause the weight carrier or diffuser, in the case of a traction wheel, to lift the wheel from the road surface, thus reducing frictional contact between the periphery of the wheel and the road surface, which aids in the recovery of the springs so that the rotative parts may assume their normal positions without strain applied to the springs.

In this housing, as clearly shown in Fig. 1, a semifluid lubricant 62 is arranged, the springs being embedded in this lubricant; and when so used, these springs act in the nature of a grease pump. Action under oscillation and depression of the weight carrier or diffuser forces grease toward the axis of the centering device, or resilient hub as it may be termed. The springs 59 are therefore maintained fully lubricated and resilient. During the rotation of the wheel, the grease tends to travel outwardly away from the axis of the device under centrifugal force, thus assuring a continual movement of the grease and thorough lubrication of the parts, even though the housing is not fully packed with grease.

The springs 54 which bear against the inner peripheral faces of the flanges and the inner edges of the circular plates or rings project slightly into the dips or depressions in such faces and edges, since they are of a diameter slightly greater than the diameters of the latter. These springs, one or more at each side of the housing, depending on the resistance desired, and naturally on the weight of the automobile and the load carried thereby, serve as a centering or resilient supporting device, avoid eccentric relations between the weight carrier or diffuser and the housing, except under rotative action, and even then eccentricity is only momentarily maintained; for example, when starting rotation in either a forward or rearward direction and during the times of stopping the rotative movement.

During the starting and stopping movements, the equalizing or governing springs 59 are drawn upon, and when the resisting forces of these governing springs is expended, the housing is compelled to rotate with the weight carrier or diffuser. Therefore, both in starting and stopping, strain is removed from the operating parts of the vehicle and during the stopping of an automobile, or of a pulley and the like, the springs 59 act as a resilient stop.

When using my improved centering device in a traction wheel of an automobile or the like, the irregularities in the road surface necessarily create main-spring deflection, with the result that the body of the vehicle is subjected to vibrations, ordinarily assumed to be absorbed by the pneumatic tires. However, it is known that the inflation of tires necessary to assure their proper functioning will not fully absorb such jars, and especially the more severe jars created when passing over bumps or through ruts. At such times the retainer springs 54 come into action regardless of the rotative position of the wheel, as there is at all times a dip or depression above the horizontal center of the wheel, which compels one of the springs 54 to enter such dip or depression while the bearing surface provided by the flange of the weight carrier or diffuser along the lower half of the wheel moves toward the center of the housing, resulting in the springs moving slightly away from the depression in the lower half of the wheel.

The weight carrier or diffuser, also referred to as the hub plate or center member, serves as one of the main members of the device; this part, for convenience being referred to as the inner member of the device, regardless of its formation and construction and its particular manner of attachment to the shaft or axle. The circular plates or rings 29 and 30, the flange 31, and the retainer rings or annuli 43 serve as the other main member of the device; which, for convenience, may be referred to as the outer main member yieldingly maintained with respect to the inner main member by the springs 54, which may more generally be termed weight-carrying springs, assisted by the equalizing or governing springs 59 which are especially employed to return the two main members rotatively to normal positions.

When starting or stopping the device, the inner main member, usually the driving member of the device, will rotate, carrying the outer member with it, but resistance offered to the rotative movement of said outer member, such as friction of a vehicle wheel against the road surface, or resistance offered by a driving belt and machinery or parts to which the belt leads, results in the inner main member slightly rotating within the outer main member until resiliently locked with said outer main member, which action takes place by reason of the flange or flanges of the inner main member moving slightly in a rotative direction with respect to the circular plates or rings 29 and 30 of the housing. This results in the dips or depressions in the inner main member moving out of registration with the dips or depressions in the circular plates or rings 29 and 30 of the housing, as shown by dotted lines in Fig. 3, also in off-center deflection; thus causing the weight-carrying springs 54 to be forced into the dips or depressions of both members and creating a lock between the two members after limited rotative relative movement of the same; such locking action being gradually increased under friction to a point which fully overcomes the driving power applied to the inner main member and consequently causes the outer main member to travel with the inner main member of the device. During all movements or actions of the two main parts of the device, whether rotative, under vertical deflection, or otherwise, the resiliency between the two is maintained so that not only is the device a resilient centering device, but when used in automobiles serves as a shock absorber.

The equalizing or governing springs 59 may be dispensed with when it is found that some of the resiliency can be sacrificed; for example in trucks, in which case the weight-carrying springs would be made heavier to provide greater resisting force; and when these springs are forced into the dips or depressions of the two main members of the device, they would serve to prevent relative rotary movement of said members, yet maintain complete resiliency between them.

When applying quick resistance to the outer member of the device, such as the application of brakes or the like, the wheel is retarded in its rotary movement, and finally stopped; but during this retarding movement the equalizing or governing springs 59 are placed under strain, one under pulling and the other under pushing strain, and by reason of the fact that at all times the weight-carrying springs are more or less under deflection, caused by the weight of the body and load carried thereby, the resistance applied to the equalizing or governing springs is more or less checked by the action of the weight-carrying springs 54, in consequence of which the equalizing or governing springs are at all times relieved of excessive strains that would tend to injure or break the same.

Having thus described my invention, what I claim is:

1. A resilient centering device, comprising an inner member having a laterally projecting portion providing an inner peripheral contact face, an outer member marginally surrounding said inner member and having a portion furnishing an inner peripheral contact face to co-act with the inner peripheral contact face of the laterally projecting portion of said inner member, and a spring expanding outwardly and bearing against said peripheral faces.

2. A resilient centering device, comprising an inner member having a laterally projecting annular flange provided with diametrically opposite depressions in its inner peripheral face, an outer member marginally surrounding said inner member and having a portion providing an inner peripheral face to co-act with the inner peripheral face of said annular flange and provided with diametrically opposite depressions, and an outwardly-expanding circular spring bearing against said inner peripheral faces and slightly bulged into the depressions in said peripheral faces.

3. A resilient centering device, comprising an inner member provided with laterally projecting annular flanges on opposite sides thereof, each of said annular flanges having diametrically opposite depressions in its inner peripheral face, the depressions at one side of said inner member being in planes at right angles to those at the other side thereof, an outer member marginally surrounding said inner member and presenting inner peripheral faces co-acting with the inner peripheral faces of said annular flanges, the inner peripheral faces of said outer member having diametrically opposite depressions therein conforming to those in said annular flanges, the depressions in the peripheral faces of said outer member being normally in registration with the depressions in said annular flanges at the same side of the inner member, and circular springs bearing against said inner peripheral faces at each side of said inner member, the springs being of a width to bear against the inner peripheral face of each annular flange and the inner peripheral face of the outer member at the same side of the device and being of a diameter to slightly extend into the depressions in said peripheral faces.

4. A resilient centering device, comprising an inner member, an outer member marginally surrounding said inner member and radially movable with respect thereto, means between said inner and outer members to yieldingly retain said members rotatively in normal position, and load-carrying springs in contact with both the outer and inner members to resist relative radial movement of said members, said means being in a circular area surrounding said load-carrying springs.

5. A resilient centering device, comprising an inner member, an outer member surrounding said inner member, means for resiliently supporting said outer member from said inner member to restrain relative radial movement of said members and relative oscillating movement thereof, said means including endless load-carrying springs, and convolute springs in a circular area surrounding said load-carrying springs.

6. A resilient centering device, comprising a circular inner member adapted to be secured to a shaft and having a laterally-projecting portion providing an inner peripheral face, an outer member surrounding said inner member and having a portion providing an inner peripheral face for co-action with the inner peripheral face of the laterally-projecting portion on said inner member, a circular spring seated against said inner peripheral faces and serving as a yielding support for said outer member, and means between said outer and inner members spaced from said inner peripheral faces to provide an annular chamber for said spring, said annular chamber having a lubricant confined therein to lubricate said spring.

7. A resilient centering device, comprising a circular inner member having laterally-projecting marginal flanges providing inner peripheral contact faces and annular flanges spaced from said marginal flanges, an outer member surrounding said inner member and having circular portions providing inner peripheral contact faces normally co-acting with the peripheral contact faces of said marginal flanges, said outer member having also inwardly-projecting annular flanges spaced from the annular flanges of said inner member, a flexible element connecting said annular flanges at each side of said inner member, said annular flanges and flexible element serving as the inner wall of an annular spring chamber, and annular springs bearing against said inner peripheral contact faces within said annular spring chamber, said annular chambers having lubricant therein to lubricate said springs.

8. A resilient centering device, comprising an inner member and an outer member at least marginally surrounding said inner member, both being provided with inwardly-facing circular surfaces of like diameter at opposite sides of said inner member, each of said circular faces being provided with concaved depressions diametrically oppositely disposed at each side of said inner member, the depressions at one side of said inner member being in planes at right angles to those at the other side thereof, and a circular spring at each side of said inner member bearing against the inwardly-facing surfaces of said inner and outer members at the same side of the device, said springs extending slightly into the concaved depressions in said inwardly-facing surfaces.

9. A resilient centering device, comprising an inner member adapted to be secured to a shaft and having a web and a rim forming opposite marginal flanges, the inner peripheral faces of said flanges being provided with diametrically opposite concaved depressions, the depressions in one flange being in a plane at right angles to those in the other, an outer member marginally surrounding said inner member and having circular portions forming inner peripheral faces of like diameter to the inner peripheral faces of said marginal flanges, the inner peripheral faces of said outer member having concaved depressions corresponding to those in said marginal flanges and in registration therewith, and circular springs at opposite sides of said inner member bearing against said inner peripheral faces and bulging outward slightly into said concaved depressions to resist relative rotation of said members and to resiliently support said outer member from said inner member.

10. A resilient centering device, comprising an inner member and an outer member at least marginally surrounding said inner member, one of said members being adapted to be rotated and cause rotation of the other, said members having corresponding spring contact surfaces, and an annular spring in contact with said surfaces to resiliently support one from the other, said springs and surfaces being arranged for co-action to resist relative rotary motion of said members and to allow limited relative radial movement thereof.

11. A resilient centering device, comprising an inner member having a hub, a web and a rim, said rim forming opposite marginal flanges, the inner peripheral faces of which are provided with concaved depressions at diametrically opposite points, the depressions in one marginal flange being in a plane at right angles to those of the other, an outer member comprising circular elements lying against the outer edge faces of said marginal flanges and having their inner edges normally flush with the inner peripheral faces of said marginal flanges, said inner edges being provided with concaved depressions normally in registration with the concaved depressions in said marginal flanges, annular side members forming part of said outer member and secured to the inner marginal portions of said circular elements, a wall between each of said side members and the web of said inner member, said walls forming annular spring chambers and at least a portion of each of said walls being formed of flexible material to permit relative movement of said outer and inner members, and springs within said spring chambers bearing against the inner peripheral faces of said marginal flanges and the inner edges of said circular elements, said spring chamber being provided with lubricant to lubricate said springs.

12. A resilient centering device, comprising an inner member and an outer member marginally overlapping said inner member, said members having similar inwardly-facing contact surfaces provided with normally registering depressions arranged at diametrically opposite points, and an outwardly-expanding circular spring bearing against said inwardly-facing contact surfaces and slightly bulged into the depressions therein.

13. A resilient centering device, comprising an inner member and an outer member telescopically disposed with reference to the marginal portion of said inner member, said outer and inner members having inwardly-facing circular contact surfaces provided with registering depressions disposed at diametrically opposite points at each side of the device, the depressions at one side of the device being normally disposed in planes at right angles to the depressions at the other side thereof, and outwardly-expanding circular springs bearing against said inwardly-facing contact surfaces and being slightly bulged into the depressions therein.

In testimony whereof, I affix my signature.

FRANK H. BEAMER.